United States Patent [19]

Serita et al.

[11] Patent Number: 4,873,039

[45] Date of Patent: Oct. 10, 1989

[54] METHOD FOR PRODUCING SHAPED ARTICLES OF CERAMICS

[75] Inventors: Tamio Serita, Chibashi; Hiroyuki Takeuchi, Minamtashi, both of Japan

[73] Assignee: Chisso Corporation, Osaka, Japan

[21] Appl. No.: 155,703

[22] Filed: Feb. 16, 1988

Related U.S. Application Data

[63] Continuation of Ser. No. 868,038, May 29, 1986, abandoned.

[30] Foreign Application Priority Data

Jun. 24, 1985 [JP] Japan ................................ 60-137289

[51] Int. Cl.$^4$ ............................................. C04B 33/32
[52] U.S. Cl. ........................................ 264/65; 264/82; 501/95
[58] Field of Search ...................... 264/65, 82; 501/95

[56] References Cited

U.S. PATENT DOCUMENTS

| | | | |
|---|---|---|---|
| 3,853,567 | 12/1974 | Verbeek | 264/65 |
| 4,097,294 | 6/1978 | Rice et al. | 106/43 |
| 4,172,108 | 10/1979 | Maeda | 264/65 |
| 4,397,828 | 8/1983 | Seyferth et al. | 423/344 |
| 4,543,344 | 9/1985 | Cannady | 264/65 |

FOREIGN PATENT DOCUMENTS

| | | |
|---|---|---|
| 0075826 | 4/1983 | European Pat. Off. . |
| 0200326 | 12/1986 | European Pat. Off. . |
| 2218960 | 11/1973 | Fed. Rep. of Germany . |
| 2190764 | 3/1974 | France . |
| 55-46995 | 11/1980 | Japan . |

OTHER PUBLICATIONS

Seyferth et al., "A Liquid Silazane Precurser to Silicon Nitride", in Communications of the American Ceramic Society, Jan. 1983.
Penn et al., J. Appl. Poly. Sci., 27, pp. 3751-3761.
Okamura et al., 187th Nat. Meeting. Am. Chem. Soc., Apr. 1984.
"Ultrastructure Processing of Ceramics, Glasses, & Composites", John Wiley & Sons, 1984.

Primary Examiner—James Derrington
Attorney, Agent, or Firm—Fred Philpitt

[57] ABSTRACT

Forming a shaped article of polysilazane, contacting this shaped article with dry ammonia at a temperature of 20°-200° C. to thereby effect infusibilization, and finally subjecting the ammonia-treated product to further heat treatment at a higher temperature in a nitrogen atmosphere to thereby produce a shaped ceramic article.

3 Claims, No Drawings

METHOD FOR PRODUCING SHAPED ARTICLES OF CERAMICS

This is a continuation of application Ser. No. 868,038, filed May 29, 1986, now abandoned and the benefits of 35 USC 120 are claimed relative to it.

BACKGROUND OF THE INVENTION

1. Field of the Invention

This invention relates to an improvement on a method for producing a silicon nitride dominating ceramics by using polysilazane as a precursor.

2. Description of the Prior Art

A so-called precursor method in which heat-resistant ceramics are produced by pyrolysis of organometallic polymers has advantages such as (1) the capability of forming products of special shape which can not obtained through conventional processings from ceramics powder (2) the ready attainment of products having A purity higher than those obtained through conventional processes, and (3) the capability of being processed at a lower temperature.

For example, a method is known in which the green fibers obtained by the melt-spinning of polycarbosilane is subjected to infusibilizing in air at about 200° C. and thereafter heating at 1300° C. in the atmosphere of an inert gas in order to obtain ceramic fibers containing, as a principal material, silicon carbide (Yajima; Chemistry Letters, p.551–554, 1976). Further, a method is known for producing ceramic fibers consisting of a mixture of silicon carbide and silicon nitride, which method involves the heating the green fibers obtained by the melt-spinning of polysilazane, in wet air at a temperature of 110°–170° C. to effect infusibilization and thereafter heating at 1200° C. (Japanese publication of examined patent application No. 46995 of 1980; FR No. 2,190,764, U.S. Pat. No. 3,853,567 and D.E. No. 2,218,960).

As an infusibilization of melt-spun green fibers as in the abovementioned two methods, the treatment with air and/or moisture is common, and in this case, it is considered that oxygen performs cross-linking between polymers and infusibilization is carried out. However, since oxygen is remaining in the form of SiO₂ in the ultimate shaped articles of ceramics when an infusibilization is carried out according to such processes, it is known that this gives A bad effect upon the strength of ceramics. (Okamura et al; the 187th Nat. Meeting. Am. Chem. Soc.; April 1984.)

SUMMARY OF THE INVENTION

The object of the present invention is to provide a method for producing shaped articles of ceramics having A lower content of SiO₂ and hence containing, as the principal component, higher silicon nitride of more strength.

Namely, the present invention resides in a method for obtaining shaped articles of ceramics having a higher content of silicon nitride by treating polysilazane articles shaped in advance, in An atmosphere of ammonia to effect infusibilization thereof and thereafter subjecting said shaped and amonia treatd articles to a higher temperature heat treatement in an inert atmosphere.

PREFERRED EMBODIMENT OF THE INVENTION

Polysilazane As referred to means a polymer having Replating units of (Si-N) as the Skelaton and side chain substituent groups of H or A hydrocarbon. Those having only H as A substituent Are preferable because the silicon nitride content of the ultimate shaped ceramic articles is higher and the ceramic yield is higher, but such a polysilazane is liquid and unstable, is gradually gelled even at a room temperature and turns into an intractable solid. Accordingly, the shaping of this material is difficult. (For example, D. Seyferth; J. Am. Ceram. Soc. Comm., Jan. 1983, C-13.)

In the case of hydrocarbon substituents, an alkyl group having 1-4 carbon atoms is preferable. A material having an aromatic group as the hydrocarbon substituent is not preferable because of lower ceramic yield.

Such a polysilazane can be prepared in general, by subjecting an aminosilane compound obtained, in general by reacting chlorosilane with ammonia or an amine, or an oligomer of an aminosilane compound to heat condensation to form a polymer. For example, according to the official gazette of Japanese examined patent application No. 46995 of 1980 and B. G. Penm; J. Appl. Poly Sci., 27,3751 (1982), CH₃SiCl₃ and CH₃NH₂ are reacted to give an aminosilane having the formula CH₃Si(NHCH₃)₃, and a melt-spinnable polysilazane can be obtained by heating this aminosilane at 520° C. As a next step, the polysilazane thus obtained is treated in the atmosphere of ammonia, but it is necessary to use the ammonia which has been sufficiently dried by passing through a dehydrating agent such as CaH₂, KOH or the like. As a treatment process, a process in which shaped articles are exposed to gaseous ammonia is adopted. In this case, the higher the concentration of the ammonia, the faster the progress of reaction and it is permissible for the amonia to contain a small amount of an inert gas such as nitrogen, argon or the like. As for the treatment temperature, A higher temperature results in shorter time so long as the temperature is in the range which does not give A harmful effect to the quality of ultimate shaped articles, but room temperature is effective and a treatment carried out at a temperature within the range of 20° C.~200° C. is generally preferable. In the case where fine or thin materials such as filaments, films or the like are shaped through a nozzle, a method in which gaseous ammonia is contacted before cooling and solidifying is particularly preferable because it enables one to carry out cooling and infusibilization simultaneously without a short time and thus provides good efficiency.

The mechanism of infusibilization of polysilazane carried out by ammonia is not clear but it is considered that cross-linking occurs as shown in the following formula.

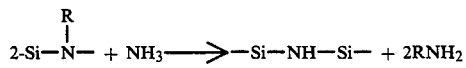

According to the method for producing shaped articles of ceramics according the present invention, as explained above, precursors containing no oxygen are obtained first of all, and by treating these at a higher temperature shaped articles of ceramics having a higher silicon nitride content can be obtained.

The production method of the present invention will be more fully described by way of a specific example and comparative examples.

EXAMPLE

The inside of the system of 0.5 l, 3 necked flask provided with a condenser, a stirrer and a gas inlet, was purged with dry nitrogen gas. To this 200 ml of $CH_2Cl_2$, was introduced as a solvent. After being cooled to $-5°$ C. with an ice-salt bath, 36.4 g (1.17 mol) of $CH_3NH_2$ was dissolved. A solution of 20 g (0.117 mol) of $SiCl_4$ dissolved in 20 ml of $CH_2Cl_2$ was added dropwise into the above-mentioned flask with stirring over a period of 30 minutes. After addition, the temperature of the reaction mixture was elevated upto room temperature and stirring was continued for a further 1 hour. Precipitated amine hydrochloride was filtered off under nitrogen-seal and solvent was distilled off with a rotary evaporator to give 13.3 g (yield 77%) of product. From the infrared absorption spectra of this product, it was confirmed that this accorded with the structure of tetra (methylamino) silane $Si(NHCH_3)_4$.

Then 1.5 g of the abovementioned compound was introduced into a 50 ml egg-plant shape flask provided with a water-cooled condenser and when heating was carried out upto 190° C. with an oil bath under a seal of nitrogen, boiling and refluxing started. Increasing the degree of vacuum insides the system in accordance with gradually declining amount of reflux after 5 hours, the system became viscous. One hour after arriving at 3 mmHg vacuum, heating was stopped and the system was cooled whereby 0.7 g of white solid polymer was obtained. From the infra-red spectra, this material was considered to be a polymer having a unit structure of

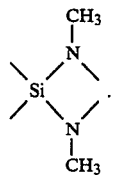

This polymer had a melting point of about 100° C. and by heating at about 120° C., melt-spinning was possible. Green fibers having a diameter of 50M could be obtained.

Several ends of these fibers (length: 20 mm) were put into a test tube and dry ammonia gas after having been passed through a KOH-filled column, was passed through the test tube at room temperature and a velocity of 4 ml/min. for 2.5 hours. The fibers thus treated were thereafter subjected to heat treatment in the stream of nitrogen in a tubular electric furnace by raising their temperature at a rate of 200° C./hr and after reaching 1100° C., they were subjected to heat treatment at 1100° C. for one hour whereby they became black ceramics fibers. As shown in Table I, the values of elemental analysis of these materials were those which contained almost no oxygen.

COMPARATIVE EXAMPLE 1

When the green fibers of polysilazane obtained according to the the previous example were subjected to heat treatment without first subjecting them to ammonia treatment the fibers melted down so that there were remaining no shape to the fibers.

COMPARATIVE EXAMPLE 2

After the green fibers of polysilazane obtained according to the very first example were left standing for one hour in the air of 20° C. and 65% relative humidity, they were subjected to heat treatment for one hour at 1100° C. in A stream of nitrogen as in the case of the very first example whereby black ceramics fibers were obtained. The values of elemental analysis of these materials were as shown in the table 1. The oxygen content of these materials were 11.4%. It is assumed that they contained a considerable amount of $SiO_2$.

TABLE 1

| Elements | Values of elemental analysis | |
|---|---|---|
| | Specific example | Comparative example 2 |
| Si | 51.0% | 53.1% |
| N | 32.4% | 23.7% |
| C | 16.6% | 11.8% |
| O | — | 11.4% |
| H | — | — |

What is claimed is:
1. The method which comprises
  (a) forming a shaped article of polysilazene,
  (b) contacting the shaped article of step (a) with dry ammonia while the shaped article is maintained at a temperature within the range of 20°–200° C. to effect infusibilization, and
  (c) subjecting the ammonia-treated product resulting from step (b) to further heat treatment at a higher temperature in a nitrogen atmosphere to thereby produce a shaped ceramic article.
2. The method according to claim 1 wherein said shaped article is a fiber.
3. The method according to claim 1 wherein said shaped articles are in the form of fibers produced by the melt-spinning a polysilazane having repeating unit structures of

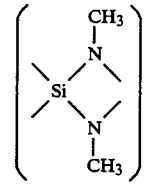

* * * * *